United States Patent
Bruhn et al.

(10) Patent No.: US 9,560,410 B2
(45) Date of Patent: Jan. 31, 2017

(54) SYSTEMS AND METHODS FOR AUTOMATIC RESUMPTION OF VIDEO STREAM FOLLOWING TRANSIENT WIFI DISCONNECT

(71) Applicant: ECHOSTAR TECHNOLOGIES L.L.C., Englewood, CO (US)

(72) Inventors: Christopher William Bruhn, Aurora, CO (US); Phuc H. Nguyen, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/621,761

(22) Filed: Feb. 13, 2015

(65) Prior Publication Data

US 2016/0191991 A1 Jun. 30, 2016

Related U.S. Application Data

(60) Provisional application No. 62/098,495, filed on Dec. 31, 2014.

(51) Int. Cl.
*H04N 7/18* (2006.01)
*H04N 21/436* (2011.01)
*H04N 21/4363* (2011.01)
*H04N 21/41* (2011.01)

(52) U.S. Cl.
CPC .... *H04N 21/43615* (2013.01); *H04N 21/4122* (2013.01); *H04N 21/4135* (2013.01); *H04N 21/43622* (2013.01); *H04N 21/43637* (2013.01)

(58) Field of Classification Search
CPC . H04N 21/43615; H04N 7/106; H04N 5/4401
USPC .............. 725/62, 80–85, 131–134, 139–142; 709/219, 229
See application file for complete search history.

(56) References Cited

U.S. PATENT DOCUMENTS

| | | | | |
|---|---|---|---|---|
| 6,829,781 B1* | 12/2004 | Bhagavath | ........... | H04N 21/235 375/E7.004 |
| 7,508,418 B2* | 3/2009 | Renkis | ............... | H04N 5/23203 348/211.2 |
| 7,895,625 B1* | 2/2011 | Bryan | .................... | H04N 5/782 725/46 |
| 9,361,011 B1* | 6/2016 | Burns | ............... | G06F 17/30825 |
| 2002/0133821 A1* | 9/2002 | Shteyn | ............... | H04N 5/44543 725/46 |
| 2004/0160908 A1* | 8/2004 | Perlman | ................ | H04W 88/04 370/328 |
| 2005/0076092 A1* | 4/2005 | Chang | ..................... | G06F 21/10 709/217 |
| 2006/0072757 A1* | 4/2006 | Renkis | ................ | G08B 13/196 380/270 |
| 2006/0130116 A1* | 6/2006 | Shi | .......................... | H04N 5/76 725/134 |

(Continued)

*Primary Examiner* — Annan Shang
(74) *Attorney, Agent, or Firm* — LK Global

(57) ABSTRACT

Systems and methods executable by a home based media distribution system for preserving the continuity of a video transmission following a WiFi disconnect include transmitting a media stream via a wireless access point associated with a wireless client; receiving a disconnect report from the access point; in response to the disconnect report, diverting the media stream to a digital video recorder (DVR); receiving a reconnect report from the access point; and automatically resuming the media stream from the point when the disconnect occurred.

20 Claims, 2 Drawing Sheets

(56) References Cited

U.S. PATENT DOCUMENTS

Figure 1:
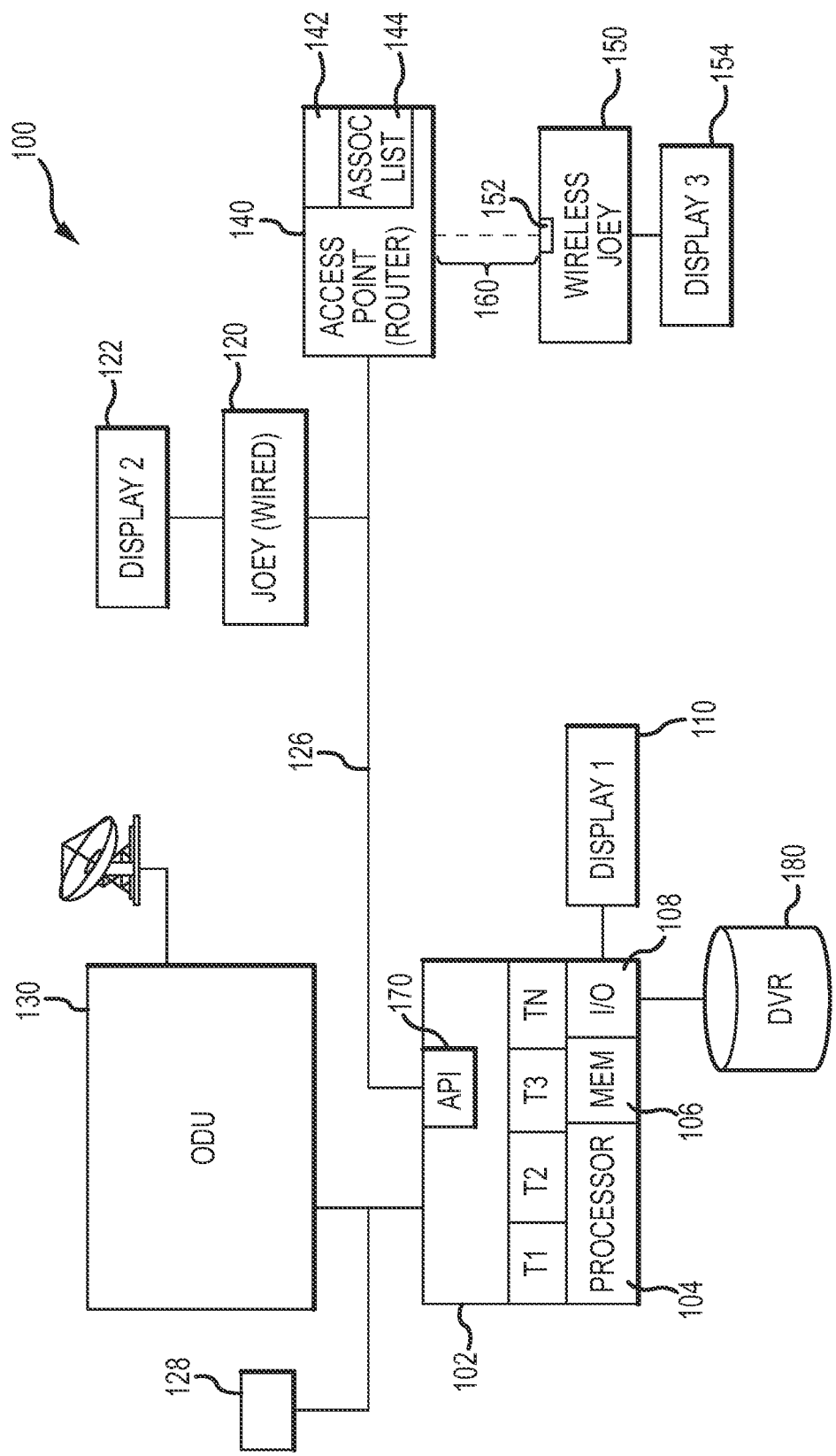

| | | | |
|---|---|---|---|
| 2007/0044132 A1* | 2/2007 | Kubo | H04N 7/1675 |
| | | | 725/116 |
| 2007/0180485 A1* | 8/2007 | Dua | H04L 29/06027 |
| | | | 725/114 |
| 2009/0046988 A1* | 2/2009 | Kenagy | H04N 5/782 |
| | | | 386/292 |
| 2010/0020177 A1* | 1/2010 | Carstens | G08B 13/19636 |
| | | | 348/158 |
| 2010/0161426 A1* | 6/2010 | Dhawan | G06Q 30/02 |
| | | | 705/14.66 |
| 2011/0320405 A1* | 12/2011 | Hsu | G06F 1/1632 |
| | | | 707/634 |

* cited by examiner

SYSTEMS AND METHODS FOR AUTOMATIC RESUMPTION OF VIDEO STREAM FOLLOWING TRANSIENT WIFI DISCONNECT

TECHNICAL FIELD

The following discussion generally relates to systems and methods for controlling a media server and a digital video recorder (DVR) in a video distribution network. More particularly, the following discussion relates to systems, methods and devices for preserving a live video stream during transient disruption of a wireless connection to a client device.

BACKGROUND

Most television viewers receive their television programming through a cable, direct broadcast satellite (DBS), IPTV or similar subscription-based service. To that end, television service is usually broadcast from a cable, DBS or other content aggregator to multiple subscribers. The subscribers may then view received content as live broadcasts from any one of a plurality of client devices connected to a home network, and/or may store the content on digital video recorders (DVRs) for later viewing.

Presently known home based video distribution networks are not well suited for wireless transmission of live video streams, in part due to transient interruptions in wireless connectivity, and the resulting effects on the user experience. Systems and methods are thus needed which overcome these limitations. Various desirable features and characteristics will become apparent from the subsequent detailed description and the appended claims, taken in conjunction with the accompanying drawings and this background section.

BRIEF SUMMARY

Various embodiments relate to systems, devices and/or methods for enhancing the user experience when viewing live video using a wireless thin client device. In various embodiments, a satellite, cable or other "whole home" television receiver/DVR video system includes a wireless access point for integrating wireless devices into the network. When a wireless dropout or disconnect is detected, the system automatically records the live video stream to the DVR. Upon resumption of the wireless connection, the user is presented with the video stream retrieved from the DVR, rather than resuming the live stream in real time. As a result, the user may enjoy a substantially uninterrupted video experience, notwithstanding the transient disruption in wireless connectivity.

Other embodiments provide television receivers or other devices comprising a processor, memory and appropriate input/output features, wherein the processor of the device is configured to execute the various processes described herein. Other embodiments relate to the processes themselves, as executed by microprocessors or other programmable hardware.

Various other embodiments, aspects and other features are described in more detail below.

BRIEF DESCRIPTION OF THE DRAWING FIGURES

Figure 2:
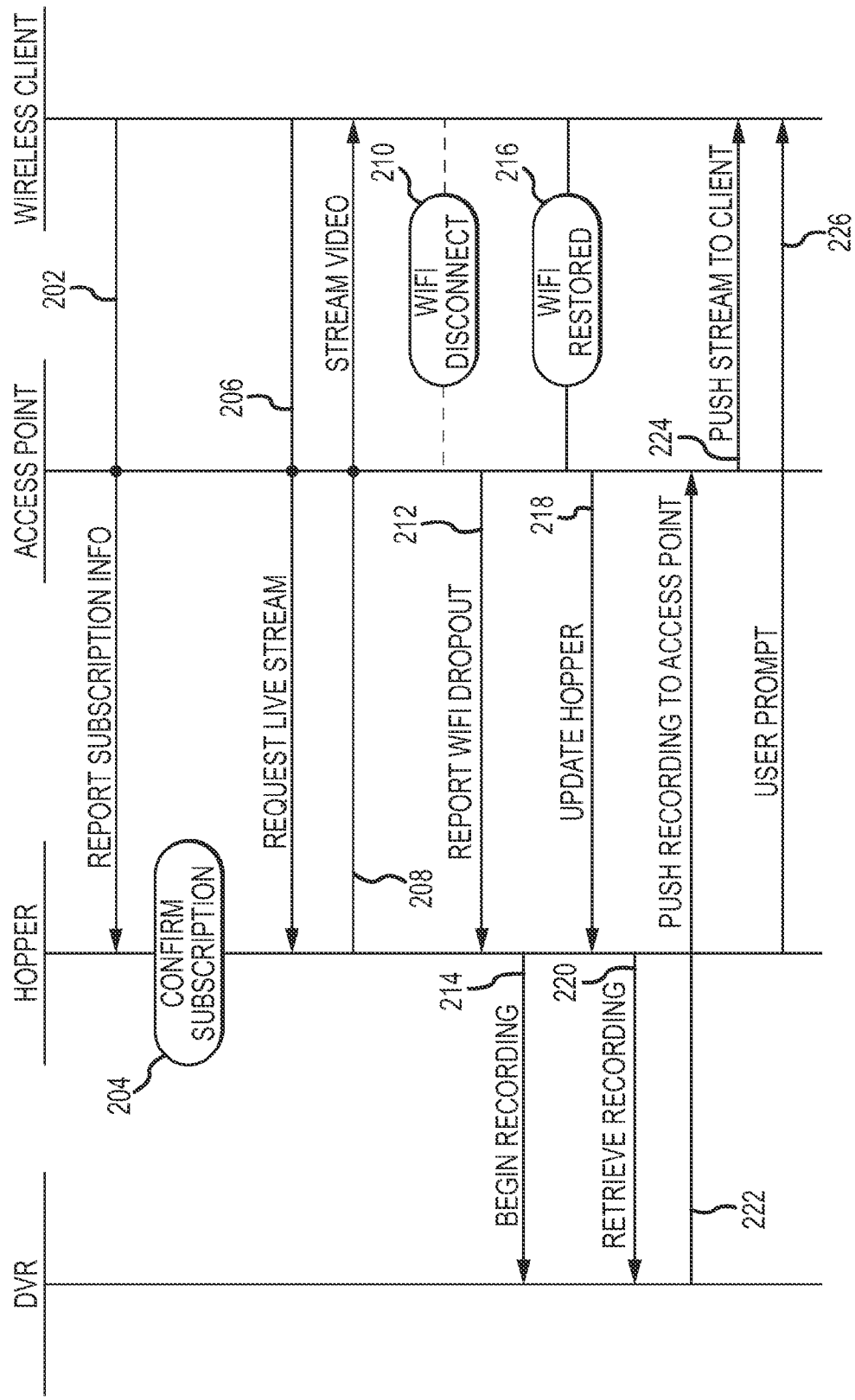

Exemplary embodiments will hereinafter be described in conjunction with the following drawing figures, wherein like numerals denote like elements, and:

FIG. 1 is a block diagram of an exemplary television receiver system including a wireless access point; and FIG. 2 is a flowchart of an exemplary process for operating the television receiver system when a disruption in the wireless connection is detected.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Various embodiments of the following discussion relate to satellite, cable or other "whole home" television receiver/DVR video systems which include a wireless access point and associated wireless clients. Note that the following discussion frequently uses the "Hopper" and "Joey" products available from Echostar/Dish Network as illustrative examples. The invention is not limited to the Hopper/Joey environment, however, and equivalent concepts could be applied in any number of other products from any number of other suppliers. For example, in some embodiments, the DVR functionality could be located remotely from the television receiver, such as a cloud-based video storage system communicating to the television receiver through the Internet.

Various embodiments are able to provide the same rich video experience to the customer's TV as legacy devices (e.g., Hopper set-top box and Joey clients) in the video network. This enables the new wireless devices to seamlessly blend into the legacy eco-system while automatically recording live streaming video to the DVR during transient disruptions in the wireless connection. Upon resumption of the wireless connection, the recorded video is retrieved from the DVR and presented to the user, without loss of continuity in the video stream. Alternatively, the system may prompt the user to skip the recorded portion of the stream, and resume the live stream in real time following restoration of the wireless connection. The wireless access point may comprise a stand-alone add on peripheral device, or the functionality of the access point could alternatively be integrated into the existing set top box or home router. Other embodiments may be differently packaged or housed as desired.

Various embodiments provide a wireless access point connected to the Hopper via MoCA, Ethernet, or the like. The access point, in turn, communicates wirelessly with its wireless thin clients through WiFi or an analogous protocol. The Hopper includes an application programming interface (API) configured to poll the access point to monitor WiFi connectivity between the access point and its wireless client(s). As long as WiFi connectivity remains intact, the Hopper pushes the MPEG signal to the wireless client, and the wireless client pushes the raw video signal to its associated device in the ordinary course, providing a live video stream to the user. Alternatively, the Hopper could simply listen for the access point to automatically send status information regarding the wireless connection, without the need to specifically initiate a polling of the access point.

When the WiFi signal between the access point and the wireless client becomes compromised, for example, due to interference, the Hopper automatically instructs the DVR to commence recording that portion of the video stream which would otherwise be pushed to the access point. When the WiFi connection is subsequently restored, the Hopper retrieves the recorded video from the DVR and pushes it to the access point, whereupon the raw video signal is presented to the user, allowing uninterrupted viewing of the video stream notwithstanding the transient disruption in the WiFi connection.

The foregoing API provides an innovative way to seamlessly continue the viewing experience after the WiFi connection is re-established, so that the viewer does not miss the portion of the video which could not be transmitted to the wireless client in real time during the period in which the WiFi connection experienced a dropout or disconnect. The flexibility of the system architecture enables the introduction of the access point and wireless clients as add-on peripheral devices to expand the system's reception capabilities, while elegantly accommodating the occasional WiFi disruption.

Various embodiments allow the viewer to experience the same entertainment on wireless clients as on any of the Whole Home wired TVs. In an embodiment, automatically recording a live stream to the DVR when a WiFi disconnect is detected, and retrieving the recorded portion from the DVR upon resumption of the WiFi connection, allows the user to resume a live stream (e.g., a sporting, news, or weather event) at the point in time at which the WiFi connection was lost, ensuring continuity of the live stream.

Turning now to the drawings and with particular reference to FIG. 1, an exemplary "whole home" television viewing system 100 suitably includes a primary set top box device (e.g., a "Hopper" device) 102 having a processor 104, a memory 106, input/output resources 108, and any number of television tuners (shown as $T_1$-$T_N$ in FIG. 1; an actual embodiment may have 3 tuners, or any other number of on-board tuners). The primary device may service an attached display device 110. System 100 also includes any number of secondary devices (e.g., "Joey" devices) 120 having appropriate processors, memory and input/output features for receiving video streams and for rendering television content to a television or other appropriate display 122. These features could include a cable interface to a MoCA or similar network, a Wi-Fi/Ethernet or other network interface, an HDMI/S-Video/component/composite or other display interface, and/or the like. A conventional Hopper-Joey system would allow television signals received via a satellite/outdoor unit (ODU) 130, or other head end to be decoded and appropriately distributed throughout the viewer's home for display on any number of different televisions.

FIG. 1 also shows a access point device 140 that includes a processor, memory, a cabled network interface (e.g. MoCA/Ethernet), a WiFi radio 142 and a software accessible WiFi association list 144. In addition, the access point 140 may be tuned (or otherwise implement protocols) to minimize packet loss and latency in transmission, to thereby maximize video quality. As with a traditional secondary (Joey) device, the access point device 140 may include an HDMI/S-Video/component/composite or other display interface, and/or additional or alternate features, as appropriate.

In the embodiment illustrated in FIG. 1, the access point device 140 is coupled to the primary receiver 102 via a MoCA or other coaxial network 126. In some embodiments, this cable network could also connect to the antenna, point-of-presence or the outdoor unit (ODU) 130. In the embodiment of FIG. 1, however, the primary receiver 102 and the access point 140 are coupled to the antenna/ODU by a separate connection to preserve bandwidth on the MoCA/coaxial network. Other embodiments could provide wireless communications, or hardwired connections via twisted pair or other wiring other than coaxial cables.

The example of FIG. 1 shows the access point device 140 coupled to a wireless client (e.g., a wireless Joey) 150 via a wireless communications port 152 which supports a WiFi connection 160. The wireless client 150, in turn, is coupled to and configured to push a raw video signal to a display device (e.g., TV) 154 when the WiFi connection 160 is properly functioning.

To that end, the primary receiver 102 typically executes control instructions that may be stored as software, firmware or the like in memory or other digital storage available to the primary receiver. These instructions are executed on a processor located within the primary receiver.

In an example embodiment, the control software includes an API module 170. The API 170 periodically polls the association list 144 to determine which, if any, wireless clients (e.g., wireless receiver iso) are currently connected to the access point 140. In this regard, those skilled in the art will appreciate that the WiFi connection 160 may be subject to external interference which impedes the electromagnetic signal, causing the wireless device 150 to disconnect from its host (e.g., access point 140). As long as the WiFi connection 160 remains intact, wireless device 150 will be included in the association list 144, and the Hopper 102 will continue to push the video stream to which the display 154 is tuned to the wireless client 150. However, in the presence of interference sufficient to disconnect the WiFi signal between the wireless device 150 and the wireless client 154, the device 154 is dropped from the association list 144.

Accordingly, when the primary device 102 polls the association list 144, the wireless client 154 does not show up as an active client, indicating that its WiFi connectivity has been lost. In response, the API 170 may be configured to display a popup (or other notice) to the user indicating that WiFi is temporarily lost, and that the video will continue streaming upon resumption of the WiFi signal. In addition, the API 170 may also be configured to instruct the primary receiver 102 to immediately divert the video stream intended for display 154 to a DVR 180 connected to the Hopper 102. The video stream intended for the display 154 is recorded to the DVR for as long as needed to ensure a continuous (albeit temporally interrupted) video stream to the display device 154, as explained below.

When the WiFi connection 160 is resumed, for example, when the object or electromagnetic source causing the interference is removed, the re-established WiFi connection is reflected in the association list 144, which informs the Hopper 102 that the wireless client 150 is once again connected to the access point 140. In response, the API 170 instructs the Hopper 102 to resume the video stream to the display device 154, via the access point 140 and wireless client 150.

In one embodiment, the Hopper 102 may be configured to automatically retrieve the video stream from the DVR 180 and push it to the wireless device 150, thereby ensuring that the viewer enjoys a continuous video stream, even though the viewing experience was temporarily suspended due to the transient loss of the WiFi connection. Alternatively, the Hopper 102 may be configured to prompt the user to either resume the video stream using the time delayed data retrieved from the DVR 180, or to simply skip time delayed portion of the stream and resume real time streaming.

In the embodiment described above, the Hopper automatically commences DVR recording in response to a WiFi disconnect. Alternatively, the Hopper 102 may begin DVR recording preemptively, in anticipation of an impending WiFi dropout.

More particularly, the API 170 may be configured to monitor the access point 140 for signs that a disconnect is likely to occur, and start recording to the DVR even before WiFi connectivity is lost. For example, if the access point 140 records a number of 'retries' or retransmissions of the pushed data from the access point to a connected device, the Hopper may determine that a disconnect is likely to occur in the near future, and begin DVR recording. In this way a time stamp may be embedded within the recorded stream of the exact point in time at which the WiFi disconnect occurred, and the Hopper can subsequently start the retransmission of the recorded video at exactly the point where the WiFi disconnected.

In yet a further alternative, the API 170 may be configured to declare an impending WiFi disconnect (and hence begin DVR recording) based on an increase in noise using either an absolute noise metric or a signal-to-noise (SNR) measurement at one or both of the access point and a wireless client). If the Hopper subsequently determines that it began DVR recording prematurely, that is, if the WiFi connection does not drop out as predicted, the system may be configured to dump the DVR recording. In addition, if the WiFi connection is dropped and subsequently restores, but the user nonetheless elects to resume the video stream in real time, the Hopper may be configured to dump the "unused" recorded segment, either automatically or in response to a user prompt.

FIG. 2 shows a process flow diagram of an example process 200 in which a live video stream provided to the wireless client device 150 is interrupted by a WiFi disconnect. The various functions shown in FIG. 2 may be performed by software, firmware or other programmable instructions stored within and executed by the various components of FIG. 1, as appropriate.

In various embodiments, the wireless client 150 reports (function 202) its subscription information to the Hopper via the access point 140 to confirm (function 204) that the wireless client is authorized to operate within the receiver environment 100. If a user requests a live broadcast, for example, the wireless client associated with the viewer's display notifies (function 206) the Hopper to allocate a tuner to the live broadcast and begin streaming (function 208). In various embodiments, the streamed content is formatted as a DLNA (digital living network alliance) stream or the like, although other embodiments may use differently formatted streams of any suitable type. The signal received by the wireless client may then be decoded, descrambled, transcoded and/or otherwise processed by the wireless client for display by its associated TV. As long as the WiFi connection between the access point and the wireless client remains stable, the live streaming (function 208) continues.

In the event the WiFi connection between the access point and the wireless client experiences a disconnect event (either actual or anticipatory, as described above) (function 210), the access point reports (e.g., via polling by the Hopper or via the Hopper listening) to the Hopper that the WiFi connection is actually or potentially disrupted (function 212). In response, the Hopper instructs (function 214) the DVR to begin recording; that is, the Hopper suspends transmission of the live video stream to the access point, and instead diverts the stream to the DVR. The DVR continues recording the stream for the duration of the live broadcast. Alternatively, the recording may continue for a predetermined (e.g., one hour) or user configurable amount of time, or until the DVR otherwise receives an instruction to stop recording. In an embodiment, the foregoing notifications may be in the form of a Java Service Over Network (JSON) request, although other embodiments may implement instructions in any suitable manner.

When the WiFi connection is restored (function 216), the access point notifies (function 218) the Hopper that the wireless client has been re-connected to the system, whereupon the Hopper retrieves (function 220) the recorded video stream from the DVR and pushes it to the access point (function 222), which in turn pushes the video stream to the wireless client (function 224) for subsequent decoding and display by the TV associated with the wireless client. If desired, the Hopper may prompt (function 226) the user to either resume the video stream at the point the WiFi connection was terminated, or simply continue the live stream in real time.

The above discussion often refers to a "MoCA network" for convenience. Equivalent embodiments could replace the MoCA network with any other coaxial, twisted pair, cabled or wireless network or other connection, as desired.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

A method executable by a home based media distribution system is thus provided for: transmitting a media stream to an access point associated with a wireless client; receiving a disconnect report from the access point; and in response to the disconnect report, diverting the media stream to a digital video recorder (DVR).

In an embodiment, the disconnect report pertains to the status of a wireless connection between the access point and the wireless client.

In an embodiment, the wireless connection is a WiFi connection.

In an embodiment, the method further includes receiving a reconnect report from the access point.

In an embodiment, the method further includes retrieving the diverted media stream from the DVR in response to receiving the reconnect report.

In an embodiment, the method further includes transmitting the retrieved media stream to the wireless client via the access point.

In an embodiment, the method further includes, in response to receiving the reconnect report, prompting a user to select one of: i) resuming transmission of the media stream at a point corresponding to the disconnect; and ii) resuming near real time transmission of the media stream.

In an embodiment, the method further includes polling the access point to obtain status information regarding the wireless connection. Alternatively, the method further includes listening for the access point to automatically send status information regarding the wireless connection.

In an embodiment, at least one of the disconnect report and reconnect report is received in response to the polling.

In an embodiment, the method further includes receiving a request from the wireless client for the media stream.

In an embodiment, the media stream corresponds to a live broadcast.

In an embodiment, the method further includes interrogating an association list maintained by the access point, and the disconnect report is based on the association list.

In an embodiment, the disconnect report is based on at least one of: i) a number of retransmission attempts by the access point; ii) a signal-to-noise level associated with the access point; and iii) a signal-to-noise level associated with the wireless client.

In an embodiment, the media stream is a video stream.

A home based media distribution system is also provided. The system includes a digital video recorder (DVR) and a television receiver having a processor, a memory, and at least two television tuners. The processor is configured to: receive a request from a wireless client for a video stream; in response to the request, transmit the video stream to an access point associated with the wireless client; receive a WiFi disconnect message from the access point; and in response to the WiFi disconnect message, record a portion of the video stream to the DVR.

In an embodiment, the processor is further configured to: receive a WiFi restore message from the access point; retrieve the recorded portion of the video stream from the DVR in response to the WiFi restore message; and transmit the retrieved portion of the video stream to the access point.

In an embodiment, the processor is further configured to: in response to the WiFi restore message, prompt a user to select one of: i) resume transmission of the video stream using the recorded portion; and ii) resume transmission of the video stream in real time.

In an embodiment, the processor is further configured to: poll the access point to obtain status information regarding the WiFi connection based on at least one of: i) a number of retransmission attempts by the access point; ii) a signal-to-noise level associated with the access point; and iii) a signal-to-noise level associated with the wireless client.

In an embodiment, the processor is configured to transmit the video stream as a DLNA stream over a MoCA network.

A method is also provided for preserving the continuity of a video transmission in a home network following a WiFi disconnect. The method includes: receiving a request from a wireless client for a video program; commencing streaming of the video program to the wireless client in response to the request; receiving an indication of a WiFi disconnect between the wireless client and a wireless access point; in response to the disconnect indication, terminating streaming to the wireless client and recording a portion of the video program to a DVR associated with the home network; receiving an indication of a WiFi reconnect between the wireless client and a wireless access point; and in response to the reconnect indication, transmitting the recorded portion to the wireless client via the wireless access point.

What is claimed:

1. A method executable by a home based media distribution system, the method comprising:
   transmitting a media stream from a media stream receiver to a wireless client via a wireless access point associated with the wireless client;
   at the media stream receiver, receiving a disconnect report at a point in time from the access point, the disconnect report indicating that the wireless client is no longer receiving the media stream from the access point; and
   in response to the disconnect report, at the point in time, directing the media stream by the media stream receiver to a digital video recorder (DVR) associated with the media stream receiver, wherein the DVR records the media stream starting from the point in time.

2. The method of claim 1, wherein the disconnect report pertains to the status of a wireless connection between the access point and the wireless client.

3. The method of claim 2, wherein the wireless connection comprises a WiFi connection.

4. The method of claim 1, further comprising:
   receiving a reconnect report from the access point.

5. The method of claim 4, further comprising:
   in response to receiving the reconnect report, retrieving the diverted media stream from the DVR.

6. The method of claim 5, further comprising:
   transmitting the retrieved media stream to the wireless client via the access point.

7. The method of claim 5, further comprising:
   in response to receiving the reconnect report, prompting a user to select one of: i) resuming transmission of the media stream at a point corresponding to the disconnect; and ii) resuming near real time transmission of the media stream.

8. The method of claim 1, further comprising:
   polling the access point to obtain status information regarding the wireless connection or allowing the access point to automatically send status information regarding the wireless connection.

9. The method of claim 8, wherein at least one of the disconnect report and reconnect report is received in response to the polling or wherein the at least one of the disconnect report and reconnect report is received automatically.

10. The method of claim 1, further comprising:
    receiving a request from the wireless client for the media stream.

11. The method of claim 1, wherein the media stream comprises a live broadcast.

12. The method of claim 1, further comprising:
    interrogating an association list maintained by the access point;
    wherein the disconnect report is based on the association list.

13. The method of claim 1, wherein the disconnect report is based on at least one of: i) a number of retransmission attempts by the access point; ii) a signal-to-noise level associated with the access point; and iii) a signal-to-noise level associated with the wireless client.

14. The method of claim 1, wherein the media stream comprises a video stream.

15. A home based media distribution system comprising a digital video recorder (DVR) and a television receiver having a processor, a memory, and at least two television tuners, wherein the processor is configured to:
    receive a request from a wireless client for a video stream;
    in response to the request, transmit the video stream to a wireless access point associated with the wireless client;
    receive a WiFi disconnect message at a point in time from the access point, the disconnect message indicating that the wireless client is no longer receiving the media stream from the access point; and
    in response to the WiFi disconnect message, at the point in time, record a portion of the video stream to the DVR, wherein the DVR records the video stream starting from the point in time.

16. The home based media distribution system of claim 15, wherein the processor is further configured to:
receive a WiFi restore message from the access point;
retrieve the recorded portion of the video stream from the DVR in response to the WiFi restore message; and
transmit the retrieved portion of the video stream to the wireless client via the access point.

17. The home based media distribution system of claim 15, wherein the processor is further configured to:
in response to the WiFi restore message, prompt a user to select one of: i) resume transmission of the video stream using the recorded portion; and ii) resume transmission of the video stream in real time.

18. The home based media distribution system of claim 15, wherein the processor is further configured to:
poll the access point to obtain status information regarding the WiFi connection based on at least one of: i) a number of retransmission attempts by the access point, ii) a signal-to-noise level associated with the access point, iii) a signal-to-noise level associated with the wireless client, iv) an association list; or
listen for the access point to automatically send status information regarding the WiFi connection based on at least one of: i) a number of retransmission attempts by the access point, ii) a signal-to-noise level associated with the access point, iii) a signal-to-noise level associated with the wireless client, iv) an association list.

19. The home based media distribution system of claim 15, wherein the processor is further configured to transmit the video stream as a DLNA stream over a MoCA network.

20. A method of preserving the continuity of a video transmission in a home network following a WiFi disconnect, comprising:
receiving a request from a wireless client for a video program;
commencing streaming of the video program to the wireless client in response to the request;
receiving an indication of a WiFi disconnect between the wireless client and a wireless access point at a point in time;
in response to the disconnect indication, at the point in time, terminating streaming to the wireless client and beginning recording a portion of the video program to a DVR associated with the home network, wherein the records the video program starting from the point in time;
receiving an indication of a WiFi reconnect between the wireless client and the access point at a later point in time; and
in response to the reconnect indication, at the later point in time, transmitting the recorded portion to the wireless client via the access point.

* * * * *